(12) United States Patent
    Xu (10) Patent No.: US 10,811,911 B2
(45) Date of Patent: Oct. 20, 2020

(54) WIRELESS ENERGY TRANSMISSION METHOD AND WIRELESS ENERGY RECEIVING DEVICE

(71) Applicant: Beijing Zhigu Rui Tuo Tech Co., Ltd, Beijing (CN)

(72) Inventor: Ran Xu, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 118 days.

(21) Appl. No.: 15/115,657

(22) PCT Filed: Jan. 15, 2015

(86) PCT No.: PCT/CN2015/070749
§ 371 (c)(1),
(2) Date: Jul. 29, 2016

(87) PCT Pub. No.: WO2015/117536
PCT Pub. Date: Aug. 13, 2015

(65) Prior Publication Data
US 2017/0170692 A1    Jun. 15, 2017

(30) Foreign Application Priority Data

Feb. 8, 2014    (CN) .......................... 2014 1 0045334

(51) Int. Cl.
*H02J 50/20*        (2016.01)
*H02J 7/02*         (2016.01)
(Continued)

(52) U.S. Cl.
CPC .............. *H02J 50/20* (2016.02); *H02J 7/025* (2013.01); *H02J 50/00* (2016.02); *H02J 50/40* (2016.02);
(Continued)

(58) Field of Classification Search
CPC .. H02J 50/20; H02J 50/80; H02J 50/00; H02J 50/40
(Continued)

(56) References Cited

U.S. PATENT DOCUMENTS 8,410,953 B2    4/2013  Zeine
8,558,661 B2    10/2013 Zeine
(Continued)

FOREIGN PATENT DOCUMENTS

CN      101711450 A    5/2010
CN      201594751 U    9/2010
(Continued)

OTHER PUBLICATIONS

International Search Report for PCT Application No. PCT/CN2015/070760, dated Apr. 17, 2015, 2 pages.
(Continued)

*Primary Examiner* — Rexford N Barnie
*Assistant Examiner* — Swarna N Chowdhuri
(74) *Attorney, Agent, or Firm* — Amin, Turocy & Watson, LLP (57) ABSTRACT

A wireless energy transmission method and a wireless energy receiving device are provided. A method includes determining wireless energy transmission efficiencies between the wireless energy receiving device and a plurality of wireless energy sending devices respectively, and receiving wireless energy transmission from the plurality of wireless energy sending devices according to the wireless energy transmission efficiencies. Energy requested or required by the wireless energy receiving device can be distributed to the plurality of wireless energy sending devices reasonably, thereby efficiently charging the wireless energy receiving device.

21 Claims, 4 Drawing Sheets

(51) Int. Cl.
*H02J 50/40* (2016.01)
*H02J 50/80* (2016.01)
*H02J 50/00* (2016.01)
*H02J 50/50* (2016.01)
*H02J 1/14* (2006.01)
*H04M 1/725* (2006.01)
*H02J 50/05* (2016.01)
*H02J 50/10* (2016.01)
*H02J 7/00* (2006.01)

(52) U.S. Cl.
CPC ............. *H02J 50/50* (2016.02); *H02J 50/80* (2016.02); *H02J 1/14* (2013.01); *H02J 7/00* (2013.01); *H02J 50/05* (2016.02); *H02J 50/10* (2016.02); *H04M 1/7253* (2013.01); *Y02B 40/90* (2013.01)

(58) Field of Classification Search
USPC ........................................................ 307/104
See application file for complete search history.

(56) References Cited

U.S. PATENT DOCUMENTS

| | | | | |
|---|---|---|---|---|
| 9,054,542 | B2* | 6/2015 | Baarman | H02J 7/025 |
| 9,407,327 | B2* | 8/2016 | Kirby | H02J 50/10 |
| 2010/0033021 | A1 | 2/2010 | Bennett | |
| 2010/0148723 | A1 | 6/2010 | Cook et al. | |
| 2011/0115303 | A1* | 5/2011 | Baarman | H02J 5/005 307/104 |
| 2011/0304216 | A1* | 12/2011 | Baarman | H02J 50/90 307/104 |
| 2013/0137455 | A1 | 5/2013 | Xia et al. | |
| 2013/0249481 | A1 | 9/2013 | Jacobs et al. | |

FOREIGN PATENT DOCUMENTS

| | | |
|---|---|---|
| CN | 102318214 A | 1/2012 |
| CN | 102714430 A | 10/2012 |
| CN | 103155353 A | 6/2013 |
| CN | 103795157 A | 5/2014 |
| CN | 103872796 A | 6/2014 |
| EP | 2654049 A2 | 10/2013 |
| JP | 2010-183812 A | 8/2010 |
| WO | 2013028111 A1 | 2/2013 |

OTHER PUBLICATIONS

"COTA is here" published online at [http://www.ossiainc.com/how.html], archived version dated Mar. 6, 2014 retrieved from the Internet Archive Wayback Machine on Aug. 5, 2016, 2 pages.

International Search Report for PCT Application No. PCT/CN2015/070749, dated Apr. 13, 2015, 2 pages.

Office Action dated Jul. 27, 2018 for U.S. Appl. No. 15/117,186, 30 pages.

* cited by examiner

FIG. 9 ered by the wireless energy receiving device to the plurality of wireless energy sending devices so as to efficiently charge the wireless energy receiving device is an issue to ponder.

WIRELESS ENERGY TRANSMISSION METHOD AND WIRELESS ENERGY RECEIVING DEVICE

RELATED APPLICATION

The present application is a U.S. National Stage filing under 35 U.S.C. § 371 of international patent cooperation treaty (PCT) application No. PCT/CN2015/070749, filed Jan. 15, 2015, and entitled "WIRELESS ENERGY TRANSMISSION METHOD AND WIRELESS ENERGY RECEIVING DEVICE", which claims the benefit of priority to Chinese Patent Application No. 201410045334.0, filed on Feb. 8, 2014, which applications are hereby incorporated into the present application by reference herein in their respective entireties.

TECHNICAL FIELD

The present application relates to the field of wireless energy transmission, and in particular, to a wireless energy transmission method and a wireless energy receiving device.

BACKGROUND

In traditional wireless charging/power supply technologies, a wireless energy sending device connected with a main power source may perform energy transmission wirelessly between the wireless energy sending device and a wireless energy receiving device. In recent years, a new wireless charging/power supply technology supports "point to point" wireless energy transmission between mobile devices, for example, a tablet PC of a user is used to charge a mobile phone and the like of the user. In such a technology, a mobile device acting as a wireless energy sending device needs to have a function of sending wireless energy to other mobile devices, and a mobile device acting as a wireless energy receiving device has a function of receiving wireless energy from other mobile devices. The new technology expands wireless charging/power supply space applicability to some extent.

In the new wireless charging/power supply technology, in the case that a mobile device which serves as a wireless energy receiving device needs to be charged while there are a plurality of mobile devices which can serve as wireless energy sending devices, how to reasonably distribute energy required by the wireless energy receiving device to the plurality of wireless energy sending devices so as to efficiently charge the wireless energy receiving device is an issue to ponder.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed descriptions of the various embodiments that follow in the disclosure.

An example objective of the present application is to provide a wireless energy transmission technology.

According to some embodiments of the present application, a wireless energy transmission method is provided, which is used in wireless energy transmission between a plurality of wireless energy sending devices and a wireless energy receiving device, and the method includes:

determining wireless energy transmission efficiencies between the wireless energy receiving device and the plurality of wireless energy sending devices respectively; and receiving wireless energy transmission from the plurality of wireless energy sending devices according to the wireless energy transmission efficiencies.

According to some other embodiments of the present application, a wireless energy receiving device is further provided, and the device includes:

a wireless energy transmission efficiency determination module, configured to determine wireless energy transmission efficiencies between the wireless energy receiving device and the plurality of wireless energy sending devices respectively; and an energy receiving module, configured to receive wireless energy transmission from the plurality of wireless energy sending devices according to the wireless energy transmission efficiencies.

The embodiments of the present application can distribute energy required by the wireless energy receiving device to the plurality of wireless energy sending devices reasonably, thereby efficiently charging the wireless energy receiving device.

The content provided above is intended to introduce some concepts to be further described below in detailed description in a simplified form. The content is neither intended to identify key features or essential features of the claimed subject matter nor intended to be used to help determination of the scope of the claimed subject matter. In addition, the claimed subject matter is not limited to implementations that solve any technical problem or all technical problems mentioned in any part of the present application.

DETAILED DESCRIPTION

Example embodiments of the present application are described in detail hereinafter with reference to the accompanying drawings (the same reference numerals in several drawings indicate the same elements) and embodiments. The following embodiments are intended to describe the present application, but not to limit the scope of the present application.

Those skilled in the art should understand that, the terms such as "first" and "second" in the present application are merely used to distinguish different steps, devices or modules, which neither represent any specific technical meaning nor represent a necessary logical order between them.

When the remaining battery power of a mobile device is low, for example, the remaining battery power is lower than a threshold or the remaining power is insufficient to complete a scheduled task to be performed by the mobile device, the mobile device needs to be charged or powered. When energy transmission is performed thereon with the wireless charging/power supply technology, the mobile device will serve as a wireless energy receiving device. Under one circumstance, there are a plurality of mobile devices having a function of sending wireless energy in a wireless energy receiving range of the wireless energy receiving device, they all can serve as wireless energy sending devices to charge the wireless energy receiving device. How to reasonably distribute energy required by the wireless energy receiving device to the plurality of wireless energy sending devices so as to efficiently charge the wireless energy receiving device is an issue to ponder.

In the present application, in order to efficiently charge the wireless energy receiving device, wireless transmission efficiencies between the wireless energy receiving device and the plurality of wireless energy sending devices are taken into account during wireless energy transmission, and are taken as a basis of distributing energy transmitted by the wireless energy sending devices to the wireless energy receiving device, so as to reduce energy loss as much as possible during the wireless energy transmission and improve the overall efficiency of the wireless energy transmission.

Figure 1:
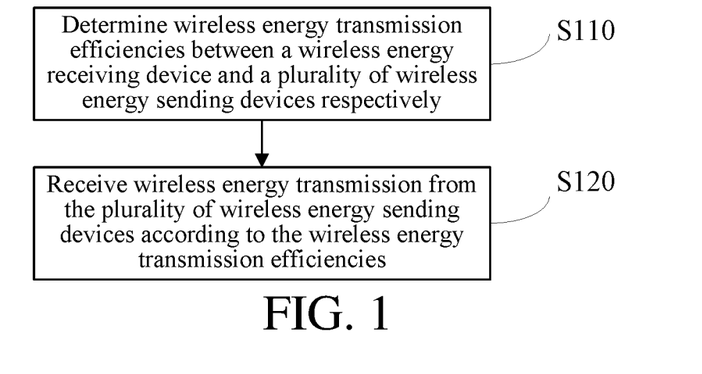
FIG. 1 is an example flowchart of steps of a wireless energy transmission method in an example embodiment of the present application.

As shown in FIG. 1, an example embodiment of the present application provides a wireless energy transmission method, used in wireless energy transmission between a plurality of wireless energy sending devices and a wireless energy receiving device, and the method includes:

Step 110: determining wireless energy transmission efficiencies between the wireless energy receiving device and the plurality of wireless energy sending devices respectively; and Step 120: receiving wireless energy transmission from the plurality of wireless energy sending devices according to the wireless energy transmission efficiencies.

Those skilled in the art can understand that, some or all steps of the method can be performed in a wireless energy receiving device. Specific functions of the steps in the wireless energy transmission method are described below in detail with reference to FIG. 1.

Step 110: Determine wireless energy transmission efficiencies between the wireless energy receiving device and the plurality of wireless energy sending devices respectively.

Because physical distances between the plurality of wireless energy sending devices and the wireless energy receiving device, transmission environments on transmission paths and other conditions are different, in order to efficiently charge the wireless energy receiving device, wireless transmission efficiencies between the wireless energy receiving device and the plurality of wireless energy sending devices are taken into account during wireless energy transmission. In the present application, the wireless transmission efficiencies between the wireless energy receiving device and the wireless energy sending devices are defined as the following formula (1):

$$\eta = \frac{e_{received}}{e_{sent}} \quad (1)$$

where η denotes the wireless energy transmission efficiency between the wireless energy receiving device and the wireless energy sending device, $e_{received}$ denotes energy received by the wireless energy receiving device, and $e_{sent}$ denotes energy sent by the wireless energy sending devices. Therefore, the wireless energy transmission efficiency is a ratio of the energy received by the wireless energy receiving device to the energy sent by the wireless energy sending device. In a lossless ideal wireless energy transmission state, the wireless energy transmission efficiency η is equal to 1; however, in a normal transmission state, the wireless energy transmission efficiency η is a value less than 1, and the closer the value is to 1, the less the loss during the wireless energy transmission is, and the higher the wireless energy transmission efficiency is.

In an example embodiment of the present application, Step 110 further includes:

Step 111: determining energy transmission paths between the wireless energy receiving device and the plurality of wireless energy sending devices respectively; and Step 112: determining the wireless energy transmission efficiencies between the wireless energy receiving device and the plurality of wireless energy sending devices respectively according to the energy transmission paths.

Figure 2:
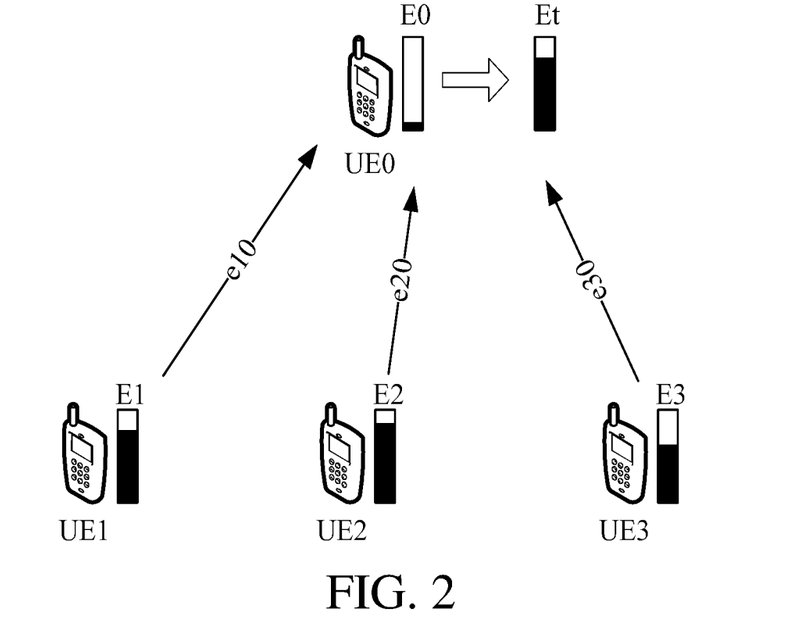
FIG. 2 is an example schematic diagram of a scenario where a wireless energy transmission method in the present application is applied.

In the example embodiment, FIG. 2 is a schematic diagram of a scenario where a wireless energy transmission method in the present application is applied. In the application scenario, a mobile device UE0 merely has remaining energy E0 and is in a state of insufficient energy, so that the mobile device UE0, as a wireless energy receiving device, needs to receive energy from one or more wireless energy sending devices. Three mobile devices having a function of sending wireless energy, such as a mobile device UE1, a mobile device UE2 and a mobile device UE3, coexist in an energy receiving range of the mobile device UE0, and they respectively have energy E1, energy E2 and energy E3, all of which can serve as wireless energy sending devices to charge the mobile device UE0.

In Step 111, the mobile device UE0 first determines energy transmission paths between the mobile device UE0 and the wireless energy sending devices UE1, UE2 and UE3 respectively. In the example embodiment, problems of energy transmission do not exist between the mobile devices UE1, UE2 and UE3, and therefore it can be uniquely determined that an energy transmission path between the mobile device UE0 and the mobile device UE1 is e10, an energy transmission path between the mobile device UE0 and the mobile device UE2 is e20, and an energy transmission path between the mobile device UE0 and the mobile device UE3 is e30, as shown in FIG. 2.

In Step 112, the mobile device UE0 may further determine wireless energy transmission efficiencies between the mobile device UE0 and the mobile device UE1, the mobile device UE2 and the mobile device UE3 respectively according to the determined energy transmission paths e10, e20 and e30. Specifically, the wireless energy transmission efficiencies may be determined according to a short training process, for example, the mobile device UE0 initiates a wireless energy transmission request to the mobile device UE1 and, upon receipt of a positive acknowledgement from the mobile device UE1, establishes a wireless energy transmission relationship between the mobile device UE0 and the mobile device UE1, and through short-time wireless energy transmission, the mobile device UE0 can obtain, according to the formula (1), a ratio between energy received by itself and energy sent by the mobile device UE1, that is, the wireless energy transmission efficiency $\eta_{10}$ of the energy transmission path e10 between the mobile device UE0 and the mobile device UE1. The rest can be done in the same manner; the mobile device UE0 can respectively determine the wireless energy transmission efficiency $\eta_{20}$ of the energy transmission path e20 between the mobile device UE0 and the mobile device UE2 and the wireless energy transmission efficiency $\eta_{30}$ of the energy transmission path e30 between the mobile device UE0 and the mobile device UE3.

According to results of Step 111 and Step 112, a wireless energy transmission path table can be formed, and the table includes the energy transmission paths between the wireless energy receiving device and the plurality of wireless energy sending devices and the wireless energy transmission efficiencies between the wireless energy receiving device and the plurality of wireless energy sending devices, as shown in Table 1:

TABLE 1

| Path ID | Passing mobile devices | Energy transmission path | Wireless energy transmission efficiency |
| --- | --- | --- | --- |
| 1 | UE1->UE0 | e10 | $\eta_{10}$ |
| 2 | UE2->UE0 | e20 | $\eta_{20}$ |
| 3 | UE3->UE0 | e30 | $\eta_{30}$ |

In another example embodiment, Step 111 may further include:

Step 1111: determining at least one candidate energy transmission path between the wireless energy receiving device and the plurality of wireless energy sending devices respectively; and Step 1112: determining the energy transmission paths between the wireless energy receiving device and the plurality of wireless energy sending devices respectively according to the at least one candidate energy transmission path.

In this case, in Step 112, wireless energy transmission efficiencies of the energy transmission paths are determined as the wireless energy transmission efficiencies between the wireless energy receiving device and the plurality of wireless energy sending devices respectively.

Figure 3:
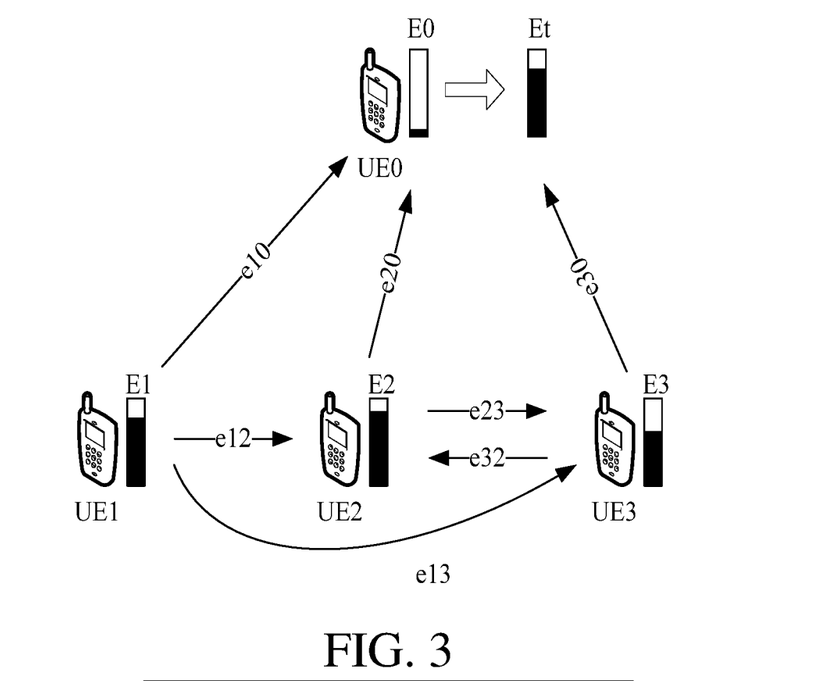
FIG. 3 is another example schematic diagram of a scenario where a wireless energy transmission method in the present application is applied.

In the example embodiment, FIG. 3 is another schematic diagram of a scenario where a wireless energy transmission method in the present application is applied. In the application scenario, a mobile device UE0 merely has remaining energy E0 and is in a state of insufficient energy, and the mobile device UE0, as a wireless energy receiving device, needs to receive energy from at least one wireless energy sending device. Three mobile devices having a function of sending wireless energy, such as a mobile device UE1, a mobile device UE2 and a mobile device UE3, coexist in an energy receiving range of the mobile device UE0, they respectively have energy E1, energy E2 and energy E3, all of which can serve as wireless energy sending devices to charge the mobile device UE0. Meanwhile, in the example embodiment, UE2 and UE3 further have a function of receiving wireless energy, and may also serve as wireless energy receiving devices to receive wireless energy transmission from other mobile devices, and such mobile devices may be referred to as "two-way wireless energy transmission devices".

In Step 1111, the mobile device UE0 first determines at least one candidate energy transmission path between the mobile device UE0 and the wireless energy sending devices UE1, UE2 and UE3 respectively. In the example embodiment, problems of energy transmission may exist between the mobile devices UE1, UE2 and UE3, and thus the process of determining energy transmission paths between the mobile device UE0 and the wireless energy sending devices is more complicated than that in the previous implementation. Because multiple possible candidate energy transmission paths may exist between a wireless energy receiving device and a certain wireless energy sending device, in order to improve the total wireless energy transmission efficiency, it is necessary to first determine the multiple possible candidate energy transmission paths and then, in the subsequent step, select the candidate energy transmission path with the highest wireless energy transmission efficiency as the energy transmission path between the wireless energy receiving device and the wireless energy sending device.

The process of determining candidate energy transmission paths between the mobile device UE0 and the mobile device UE1 is taken as an example below. As shown in FIG. 3, because the mobile devices UE2 and UE3 are two-way wireless energy transmission devices, it is likely that the mobile device UE0 receives wireless energy transmission from the mobile device UE1 through multiple possible candidate energy transmission paths, and the candidate energy transmission paths include: (1) an energy transmission path e10 from the mobile device UE1 directly to the mobile device UE0; (2) an energy transmission path e12→e20 where energy is transmitted from the mobile device UE1 to the mobile device UE2 and then from the mobile device UE2 to the mobile device UE0; in the path, the mobile device UE2 serves as an energy transmission relay device; (3) an energy transmission path e13→e30 where energy is transmitted from the mobile device UE1 to the mobile device UE3 and then from the mobile device UE3 to the mobile device UE0; in the path, the mobile device UE3 serves as an energy transmission relay device; (4) an energy transmission path e12→e23→e30 where energy is transmitted from the mobile device UE1 to the mobile device UE2, from the mobile device UE2 to the mobile device UE3, and then from the mobile device UE3 to the mobile device UE0; in the path, the mobile device UE2 and the mobile device UE3 serve as energy transmission relay devices; and (5) an energy transmission path e13→e32→e20 where energy is transmitted from the mobile device UE1 to the mobile device UE3, from the mobile device UE3 to the mobile device UE2 and from the mobile device UE2 to the mobile device UE0; in the path, the mobile device UE3 and the mobile device UE2 serve as energy transmission relay devices.

Similarly, as shown in FIG. 3, it is determined that candidate energy transmission paths through which the mobile device UE0 receives wireless energy transmission from the mobile device UE2 include: (6) an energy transmission path e20 from the mobile device UE2 directly to the mobile device UE0; and (7) an energy transmission path e23→e30 where energy is transmitted from the mobile device UE2 to the mobile device UE3 and then from the mobile device UE3 to the mobile device UE0. It is determined that candidate energy transmission paths through which the mobile device UE0 receives wireless energy transmission from the mobile device UE3 include: (8) an energy transmission path e30 from the mobile device UE3 directly to the mobile device UE0; and (9) an energy transmission path e32→e20 where energy is transmitted from the mobile device UE3 to the mobile device UE2 and then from the mobile device UE2 to the mobile device UE0.

The multiple candidate energy transmission paths and wireless energy transmission efficiencies corresponding thereto are all reflected in a path table shown in Table 2:

TABLE 2

| Path ID | Passing mobile devices | Candidate energy transmission path | Wireless energy transmission efficiency |
|---|---|---|---|
| 1 | UE1->UE0 | e10 | $\eta_{10}$ |
| 2 | UE1->UE2->UE0 | e12->e20 | $\eta_{12} * \eta_{20}$ |
| 3 | UE1->UE3->UE0 | e13->e30 | $\eta_{13} * \eta_{30}$ |
| 4 | UE1->UE2->UE3->UE0 | e12->e23->e30 | $\eta_{12} * \eta_{23} * \eta_{30}$ |
| 5 | UE1->UE3->UE2->UE0 | e13->e32->e20 | $\eta_{13} * \eta_{32} * \eta_{20}$ |
| 6 | UE2->UE0 | e20 | $\eta_{20}$ |
| 7 | UE2->UE3->UE0 | e23->e30 | $\eta_{23} * \eta_{30}$ |
| 8 | UE3->UE0 | e30 | $\eta_{30}$ |
| 9 | UE3->UE2->UE0 | e32->e20 | $\eta_{32} * \eta_{20}$ |

In Step 1112, it is necessary to respectively determine energy transmission paths between the wireless energy receiving device and the wireless energy sending devices from the determined multiple candidate energy transmission paths. In the process, it is necessary to calculate wireless energy transmission efficiencies of the candidate energy transmission paths respectively, so as to select the energy transmission path with the highest wireless energy transmission efficiency as the energy transmission path.

Those skilled in the art can understand that, for each candidate energy transmission path, wireless energy transmission efficiency thereof is the product of wireless energy transmission efficiencies of all sub-paths included in the path. By taking Path 4 in the Table 2 as an example, through the candidate energy transmission path, energy is transmitted from the mobile device UE1 to the mobile device UE2, from the mobile device UE2 to the mobile device UE3 and then from the mobile device UE3 to the mobile device UE0, which includes three sub-paths, namely, e12, e23 and e30, and the wireless energy transmission efficiency of the Path 4 is the product of wireless energy transmission efficiencies of the sub-paths e12, e23 and e30, that is, $\eta_{12}*\eta_{23}*\eta_{30}$.

Specifically, similar to the previous example embodiment, the wireless energy transmission efficiencies of the sub-paths can be determined through a short training process, for example, the mobile device UE0 initiates a wireless energy transmission request to the mobile device UE1 and, upon receipt of a positive acknowledgement from the mobile device UE1, establishes a wireless energy transmission relationship between the mobile device UE0 and the mobile device UE1, and through short-time wireless energy transmission, the mobile device UE0 can obtain, according to the formula (1), a ratio between wireless energy received by itself and wireless energy sent by the mobile device UE1, that is, the wireless energy transmission efficiency $\eta_{10}$ of the energy transmission path e10 between the mobile device UE0 and the mobile device UE1. The rest can be done in the same manner; the wireless energy transmission efficiencies of all the sub-paths can be obtained through calculation in a similar manner.

By taking determination of an energy transmission path between the mobile device UE0 and the mobile device UE1 as an example, after wireless energy transmission efficiencies of candidate energy transmission paths 1-5 are calculated respectively (as shown in Table 2), the candidate energy transmission path with the highest wireless energy transmission efficiency is selected as the energy transmission path. Suppose, in the implementation, the wireless energy transmission efficiency $\eta_{12}*\eta_{20}$ of the candidate energy transmission path 2 is higher than the wireless energy transmission efficiencies of other four paths, the path 2 is determined as the energy transmission path between the mobile device UE0 and the mobile device UE1. In a similar manner, suppose a candidate energy transmission path 6 (e20, the wireless energy transmission efficiency is $\eta_{20}$) is determined as the energy transmission path between the mobile device UE0 and the mobile device UE2, and a candidate energy transmission path 9 (e32→e20, the wireless energy transmission efficiency is $\eta_{32}*\eta_{20}$) is determined as the energy transmission path between the mobile device UE0 and the mobile device UE3.

According to the above steps, a wireless energy transmission path table can be formed, which includes the energy transmission paths between the wireless energy receiving device and the plurality of wireless energy sending devices and the wireless energy transmission efficiencies between the wireless energy receiving device and the plurality of wireless energy sending devices, as shown in Table 3:

TABLE 3

| Path ID | Passing mobile devices | Energy transmission path | Wireless energy transmission efficiency |
|---|---|---|---|
| 2 | UE1->UE2->UE0 | e12->e20 | $\eta_{12} * \eta_{20}$ |
| 6 | UE2->UE0 | e20 | $\eta_{20}$ |
| 9 | UE3->UE2->UE0 | e32->e20 | $\eta_{32} * \eta_{20}$ |

In Step 112, according to the energy transmission paths determined, wireless energy transmission efficiencies of the energy transmission paths are determined as the wireless energy transmission efficiencies between the wireless energy receiving device UE0 and the plurality of wireless energy sending devices UE1, UE2 and UE3. Specifically, the wireless energy transmission efficiency between the mobile device UE0 and the mobile device UE1 is $\eta_{12}*\eta_{20}$, the wireless energy transmission efficiency between the mobile device UE0 and the mobile device UE2 is $\eta_{20}$, and the wireless energy transmission efficiency between the mobile device UE0 and the mobile device UE3 is $\eta_{32}*\eta_{20}$.

In the various example embodiments of Step 110 described above, some or all the sub-steps of Step 110 are implemented by a wireless energy receiving device, and those skilled in the art can understand that, some or all of the sub-steps of Step 110 may also be implemented at a wireless energy sending device, or may also be implemented by another device independent of the wireless energy receiving device and the wireless energy sending device.

Step 120: Receive wireless energy transmission from the plurality of wireless energy sending devices according to the wireless energy transmission efficiencies.

In Step 110, wireless transmission efficiencies between the wireless energy receiving device and the plurality of wireless energy sending devices have been determined, the wireless transmission efficiencies reflect the degrees of energy loss during wireless energy transmission, and are taken as a basis of distributing energy transmitted by the wireless energy sending devices to the wireless energy receiving device, so as to reduce energy loss as much as possible during the wireless energy transmission and improve the overall efficiency of the wireless energy transmission.

In the example embodiment of the present application, Step 120 may include:

Step 121: performing energy distribution in the plurality of wireless energy sending devices according to the wireless energy transmission efficiencies; and Step 122: receiving the wireless energy transmission from the plurality of wireless energy sending devices according to results of the energy distribution.

In an implementation, FIG. 2 is a schematic diagram of a scenario where a wireless energy transmission method in the present application is applied. In the application scenario, a mobile device UE0 merely has remaining energy E0, and the energy needs to be supplemented to Et (the energy Et may be a threshold specified by a user or energy required by the mobile device to run a task); therefore, the total energy that the plurality of wireless energy sending devices needs to transmit to the mobile device UE0 is:

$$\Delta E = Et - E0 \quad (2)$$

In Step 121, the mobile device UE0, according to the wireless energy transmission efficiencies determined in Step 110, performs energy distribution in the plurality of wireless energy sending devices, that is, distributes required energy $\Delta E$ to a plurality of available mobile devices UE1, UE2 and UE3, so that the mobile devices perform wireless energy transmission on the mobile device UE0 according to the distributed energy.

As shown in FIG. 2, currently, energy of the mobile device UE1 is E1, energy of the mobile device UE2 is E2, and energy of the mobile device UE3 is E3; suppose the energy distributed to the mobile device UE1 is $\Delta E1$, the energy distributed to the mobile device UE2 is $\Delta E2$, and the energy distributed to the mobile device UE2 is $\Delta E3$. According to the energy transmission paths and the corresponding wireless energy transmission efficiencies shown in the wireless energy transmission path table in Table 1, the energy distributed to the plurality of wireless energy sending devices should satisfy the following relation:

$$\Delta E1 * \eta_{10} + \Delta E2 * \eta_{20} + \Delta E3 * \eta_{30} = \Delta E \quad (3)$$

In the example embodiment, energy $\Delta E$ required by the wireless energy receiving device may be distributed to a plurality of available wireless energy sending devices according to a predetermined rule.

For example, the predetermined rule may be that the total energy loss in the whole wireless energy transmission process is the minimum. In this case, on the basis of satisfying the formula (3), the energy distributed to the plurality of wireless energy sending devices should further satisfy:

$$\min(\Delta E1 * (1-\eta_{10}) + \Delta E2 * (1-\eta_{20}) + \Delta E3 * (1-\eta_{30})) \quad (4)$$

After the wireless energy transmission is performed on the wireless energy receiving device according to the predetermined rule, the total energy loss in the whole wireless energy transmission process is the minimum, and the overall energy transmission efficiency is the highest.

For another example, the predetermined rule may be that, a proportion of remaining energy of each wireless energy sending device after completion of charging keeps unchanged compared with a proportion of remaining energy of each wireless energy sending device before charging. In this case, on the basis of satisfying the formula (3), the energy distributed to the plurality of wireless energy sending devices should further satisfy:

$$E1/E2 = (E1 - \Delta E1)/(E2 - \Delta E2) \quad (5)$$

$$E1/E3 = (E1 - \Delta E1)/(E3 - \Delta E3) \quad (6)$$

After the wireless energy transmission is performed on the wireless energy receiving device according to the predetermined rule, the proportion of the remaining energy of each wireless energy sending device keeps unchanged before and after charging, and the energy required by the wireless energy receiving device has been evenly distributed to the wireless energy sending devices.

For another example, the predetermined rule may be that remaining energy of the wireless energy sending devices is as equal as possible after completion of charging. In this case, suppose remaining energy of the wireless energy sending devices after completion of charging is $E_{remain}$. On the basis of satisfying the formula (3), the energy distributed to the plurality of wireless energy sending devices should satisfy:

$$\Delta E1 = E1 - E_{remain} \quad (7)$$

$$\Delta E2 = E2 - E_{remain} \quad (8)$$

$$\Delta E3 = E3 - E_{remain} \quad (9)$$

After the wireless energy transmission is performed on the wireless energy receiving device according to the predetermined rule, remaining energy of the wireless energy sending devices is as equal as possible, so that the wireless energy sending devices keep relatively balanced energy storage after charging.

Those skilled in the art can understand that, in addition to the above-mentioned predetermined rules, a user can determine the predetermined rule according to own needs thereof and distribute energy required by the wireless energy receiving device to a plurality of available wireless energy sending devices according to the predetermined rule. If a certain predetermined rule determined cannot achieve satisfactory technical effects, those skilled in the art can further make a flexible selection in other predetermined rules, thereby achieving wireless energy transmission on the wireless energy receiving device.

In Step 122, the wireless energy sending devices can transmit the distributed energy to the wireless energy receiving device respectively according to distribution results of the energy distributed to the wireless energy sending devices. In the implementation, the mobile device UE1 transmits $\Delta E1$, the mobile device UE2 transmits $\Delta E2$, and the mobile device UE3 transmits $\Delta E3$ to the mobile device UE0 respectively according to the energy transmission paths shown in Table 1. According to the formula (3), the wireless energy receiving device (the mobile device UE0) will receive the total energy $\Delta E$ from the wireless energy sending devices, thereby achieving the charging target Et.

In a possible situation of Step 122, the wireless energy sending devices transmit the distributed energy to the wireless energy receiving device in a predetermined order (for example, the mobile device UE1 first performs energy transmission on the mobile device UE0, then the mobile device UE3 performs energy transmission thereon, and finally the mobile device UE2 performs energy transmission thereon), and the wireless energy receiving device receives the energy from the wireless energy sending devices in the predetermined order. The predetermined order may be determined by the wireless energy receiving device, and may also be determined by another device independent of the wireless energy receiving device.

In another implementation, FIG. 3 is another schematic diagram of a scenario where a wireless energy transmission method in the present application is applied. In the application scenario, a mobile device UE0 merely has remaining energy E0 and the energy needs to be supplemented to Et; therefore, the total energy that the plurality of wireless energy sending devices needs to transmit to the mobile device UE0 is:

$$\Delta E = Et - E0 \quad (2)$$

In Step 121, the mobile device UE0, according to the wireless energy transmission efficiencies determined in Step 110, performs energy distribution in the plurality of wireless energy sending devices, that is, distributes required energy ΔE to a plurality of available mobile devices UE1, UE2 and UE3, so that the mobile devices perform the wireless energy transmission on the mobile device UE0 according to the distributed energy.

As shown in FIG. 3, currently, energy of the mobile device UE1 is E1, energy of the mobile device UE2 is E2, and energy of the mobile device UE3 is E3; suppose the energy distributed to the mobile device UE1 is ΔE1, the energy distributed to the mobile device UE2 is ΔE2, and the energy distributed to the mobile device UE2 is ΔE3. According to the energy transmission paths and the corresponding wireless energy transmission efficiencies shown in the wireless energy transmission path table in Table 3, the energy distributed to the plurality of wireless energy sending devices should satisfy the following relation:

$$\Delta E1 * \eta_{12} * \eta_{20} + \Delta E2 * \eta_{20} + \Delta E3 * \eta_{32} * \eta_{20} = \Delta E \quad (10)$$

In the example embodiment, energy ΔE required by the wireless energy receiving device may be distributed to a plurality of available wireless energy sending devices according to a predetermined rule.

For example, the predetermined rule may be that the total energy loss in the whole wireless energy transmission process is the minimum. After the wireless energy transmission is performed on the wireless energy receiving device according to the predetermined rule, the total energy loss in the whole wireless energy transmission process is the minimum, and the overall energy transmission efficiency is the highest.

For another example, the predetermined rule may be that, a proportion of remaining energy of each wireless energy sending device after completion of charging keeps unchanged compared with a proportion of remaining energy of each wireless energy sending device before charging. After the wireless energy transmission is performed on the wireless energy receiving device according to the predetermined rule, the proportion of the remaining energy of each wireless energy sending device keeps unchanged before and after charging, and the energy required by the wireless energy receiving device has been evenly distributed between the wireless energy sending devices.

For another example, the predetermined rule may be that remaining energy of the wireless energy sending devices is as equal as possible after completion of charging. After the wireless energy transmission is performed on the wireless energy receiving device according to the predetermined rule, the remaining energy of the wireless energy sending devices is as equal as possible, so that the wireless energy sending devices keep relatively balanced energy storage after charging.

Those skilled in the art can understand that, in addition to the above-mentioned predetermined rules, a user can determine the predetermined rule according to own needs thereof and distribute energy required by the wireless energy receiving device to a plurality of available wireless energy sending devices according to the predetermined rule. If a certain predetermined rule determined cannot achieve satisfactory technical effects, those skilled in the art can further make a flexible selection in other predetermined rules, thereby achieving wireless energy transmission on the wireless energy receiving device.

In Step 122, the wireless energy sending devices can transmit the distributed energy to the wireless energy receiving device respectively according to distribution results of the energy distributed to the wireless energy sending devices. In the implementation, the mobile device UE1 transmits ΔE1, the mobile device UE2 transmits ΔE2, and the mobile device UE3 transmits ΔE3 to the mobile device UE0 respectively according to the energy transmission paths shown in Table 3. According to the formula (10), the wireless energy receiving device (the mobile device UE0) will receive the total energy ΔE from the wireless energy sending devices, thereby achieving the charging target Et.

In a possible situation of Step 122, the wireless energy sending devices transmit the distributed energy to the wireless energy receiving device in a predetermined order, and the wireless energy receiving device receives the energy from the wireless energy sending devices in the predetermined order. The predetermined order may be determined by the wireless energy receiving device, and may also be determined by another device independent of the wireless energy receiving device.

In another example embodiment of the present application, Step 120 may further include:

Step 123: notifying corresponding wireless energy sending devices of the results of the energy distribution corresponding to the wireless energy sending devices.

In this way, the wireless energy sending devices can acquire distribution results of energy distributed thereto and transmit the distributed energy to the wireless energy receiving device according to the results. In addition, when the wireless energy sending devices need to transmit the distributed energy to the wireless energy receiving device in a predetermined order, in Step 123, the predetermined order may be further sent to the wireless energy sending devices.

In view of the above, the wireless energy transmission method in the implementations of the present application can distribute energy required by the wireless energy receiving device to the plurality of wireless energy sending devices reasonably, thereby efficiently charging the wireless energy receiving device.

Those skilled in the art should understand that, in the methods of the implementations of the present application, sequence numbers of the steps do not mean an order of execution, the order of execution of the steps should be determined according to functions and internal logic thereof, but should not pose any limitation to implementation of the specific embodiments of the present application.

In addition, an embodiment of the present application further provides a computer-readable medium, including a computer-readable instruction which performs the following operations when being executed: performing the operations of steps S110 and S120 of the method in the implementation shown in FIG. 1.

Figure 4:
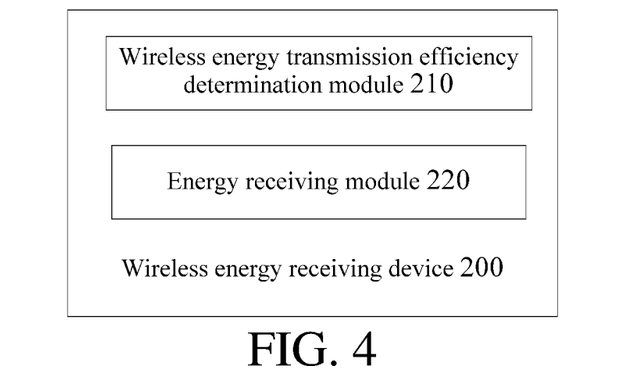
FIG. 4 is an example functional structure diagram of a wireless energy receiving device in an example embodiment of the present application.

As shown in FIG. 4, an example embodiment of the present application provides a wireless energy receiving device, and the device includes:

a wireless energy transmission efficiency determination module 210, configured to determine wireless energy transmission efficiencies between the wireless energy receiving device and the plurality of wireless energy sending devices respectively; and an energy receiving module 220, configured to receive wireless energy transmission from the plurality of wireless energy sending devices according to the wireless energy transmission efficiencies.

Specific functions of the modules and units in the wireless energy receiving device are described below in detail with reference to FIG. 4 to FIG. 8.

The wireless energy transmission efficiency determination module 210 is configured to determine wireless energy transmission efficiencies between the wireless energy receiving device and the plurality of wireless energy sending devices respectively.

Figure 5:
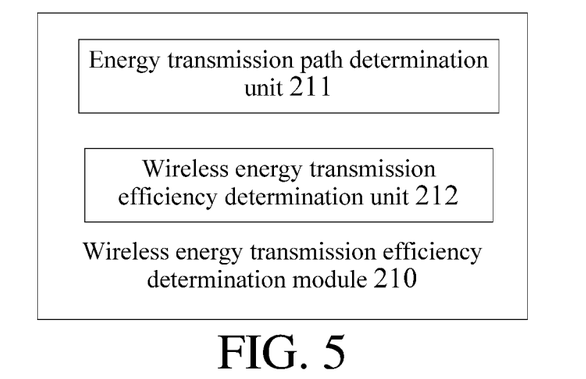
FIG. 5 is an example functional structure diagram of a wireless energy transmission efficiency determination module in an example embodiment of the present application.

In an example embodiment of the present application, as shown in FIG. 5, the wireless energy transmission efficiency determination module 210 further includes:

an energy transmission path determination unit 211, configured to determine energy transmission paths between the wireless energy receiving device and the plurality of wireless energy sending devices respectively; and a wireless energy transmission efficiency determination unit 212, configured to determine the wireless energy transmission efficiencies between the wireless energy receiving device and the plurality of wireless energy sending devices respectively according to the energy transmission paths.

In the example embodiment, in the application scenario shown in FIG. 2, the energy transmission path determination unit 211 in the mobile device UE0 first determines energy transmission paths between the mobile device UE0 and the wireless energy sending devices UE1, UE2 and UE3 respectively. In the example embodiment, the energy transmission path determination unit 211 determines that an energy transmission path between the mobile device UE0 and the mobile device UE1 is e10, an energy transmission path between the mobile device UE0 and the mobile device UE2 is e20, and an energy transmission path between the mobile device UE0 and the mobile device UE3 is e30, as shown in FIG. 2.

Afterwards, the wireless energy transmission efficiency determination unit 212 in the mobile device UE0 may further determine wireless energy transmission efficiencies between the mobile device UE0 and the mobile device UE1, the mobile device UE2 and the mobile device UE3 respectively according to the determined energy transmission paths e10, e20 and e30.

Figure 6:
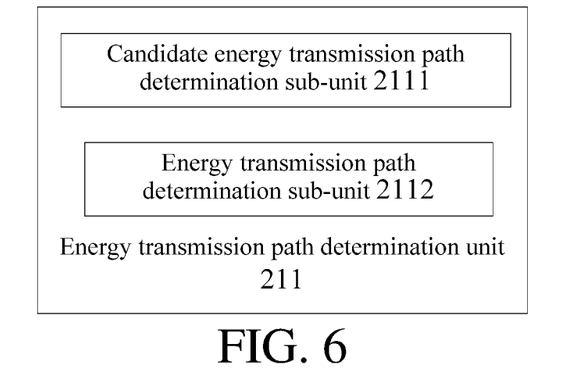
FIG. 6 is an example functional structure diagram of an energy transmission path determination unit in an example embodiment of the present application.

In another example embodiment of the present application, as shown in FIG. 6, the energy transmission path determination unit 211 may further include:

a candidate energy transmission path determination sub-unit 2111, configured to determine at least one candidate energy transmission path between the wireless energy receiving device and the plurality of wireless energy sending devices respectively; and an energy transmission path determination sub-unit 2112, configured to determine the energy transmission paths between the wireless energy receiving device and the plurality of wireless energy sending devices respectively according to the at least one candidate energy transmission path.

In this case, the wireless energy transmission efficiency determination unit 212 is further configured to determine wireless energy transmission efficiencies of the energy transmission paths as the wireless energy transmission efficiencies between the wireless energy receiving device and the plurality of wireless energy sending devices respectively.

In the example embodiment, in the application scenario shown in FIG. 3, the candidate energy transmission path determination sub-unit 2111 in the energy transmission path determination unit 211 of the mobile device UE0 first determines at least one candidate energy transmission path between the mobile device UE0 and the wireless energy sending devices UE1, UE2 and UE3 respectively.

The energy transmission path determination sub-unit 2112 in the energy transmission path determination unit 211 of the mobile device UE0 needs to respectively determine energy transmission paths between the wireless energy receiving device and the wireless energy sending devices from the determined multiple candidate energy transmission paths. In the process, it is necessary to calculate wireless energy transmission efficiencies of the candidate energy transmission paths respectively, so as to select the energy transmission path with the highest wireless energy transmission efficiency as the energy transmission path.

Afterwards, the wireless energy transmission efficiency determination unit 212 in the mobile device UE0 determines, according to the energy transmission paths determined, wireless energy transmission efficiencies of the energy transmission paths as the wireless energy transmission efficiencies between the wireless energy receiving device UE0 and the plurality of wireless energy sending devices UE1, UE2 and UE3.

The energy receiving module 220 is configured to receive wireless energy transmission from the plurality of wireless energy sending devices according to the wireless energy transmission efficiencies.

Figure 7:
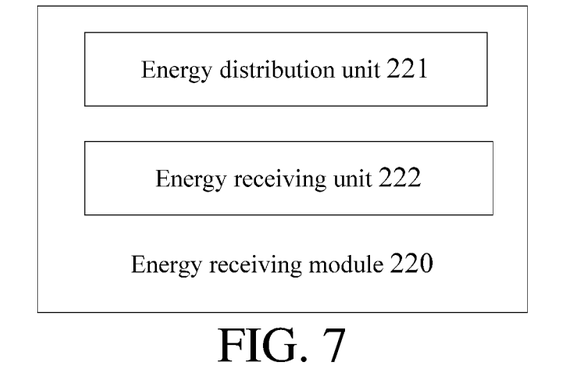
FIG. 7 is an example functional structure diagram of an energy receiving module in an example embodiment of the present application.

In the example embodiment of the present application, as shown in FIG. 7, the energy receiving module 220 may include:

an energy distribution unit 221, configured to perform energy distribution in the plurality of wireless energy sending devices according to the wireless energy transmission efficiencies; and an energy receiving unit 222, configured to receive the wireless energy transmission from the plurality of wireless energy sending devices according to results of the energy distribution.

In one implementation, in the application scenario shown in FIG. 2 or FIG. 3, the energy distribution unit 221 in the mobile device UE0 performs energy distribution in the plurality of wireless energy sending devices according to the wireless energy transmission efficiencies determined, that is, distributes required energy $\Delta E$ to a plurality of available mobile devices UE1, UE2 and UE3, so that the mobile devices perform the wireless energy transmission on the mobile device UE0 according to the distributed energy. In the example embodiment, the energy distribution unit 221 can distribute the energy $\Delta E$ required by the wireless energy receiving device to a plurality of available wireless energy sending devices according to a predetermined rule.

For example, the predetermined rule may be that the total energy loss in the whole wireless energy transmission process is the minimum. For another example, the predetermined rule may be that, a proportion of remaining energy of each wireless energy sending device after completion of charging keeps unchanged compared with a proportion of remaining energy of each wireless energy sending device before charging. For another example, the predetermined rule may be that remaining energy of the wireless energy sending devices is as equal as possible after completion of charging.

The wireless energy sending devices can transmit the distributed energy to the wireless energy receiving device respectively according to distribution results of the energy distributed to the wireless energy sending devices. The energy receiving unit 222 of the mobile device UE0 can receive the distributed energy.

In a possible situation, the energy receiving unit 222 of the mobile device UE0 receives energy from the wireless energy sending devices in a predetermined order.

Figure 8:
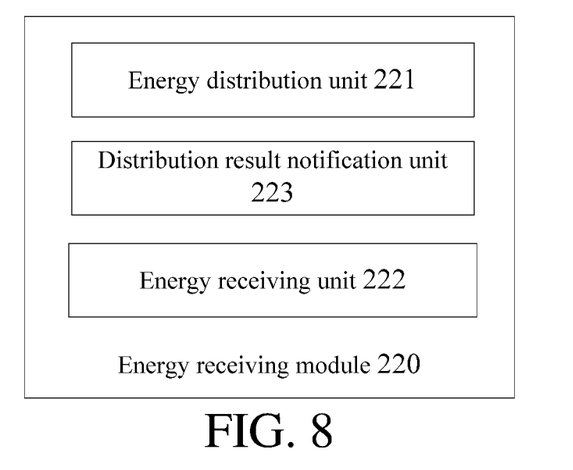
FIG. 8 is an example functional structure diagram of an energy receiving module in another example embodiment of the present application.

In another example embodiment of the present application, as shown in FIG. 8, the energy receiving module 220 may further include:

a distribution result notification unit 223, configured to notify corresponding wireless energy sending devices of the results of the energy distribution corresponding to the wireless energy sending devices. In this way, the wireless energy sending devices can acquire distribution results of energy distributed thereto and transmit the distributed energy to the wireless energy receiving device according to the results.

In view of the above, the wireless energy receiving device in the implementations of the present application can distribute energy required by the wireless energy receiving device to the plurality of wireless energy sending devices reasonably, thereby efficiently charging the wireless energy receiving device.

Figure 9:
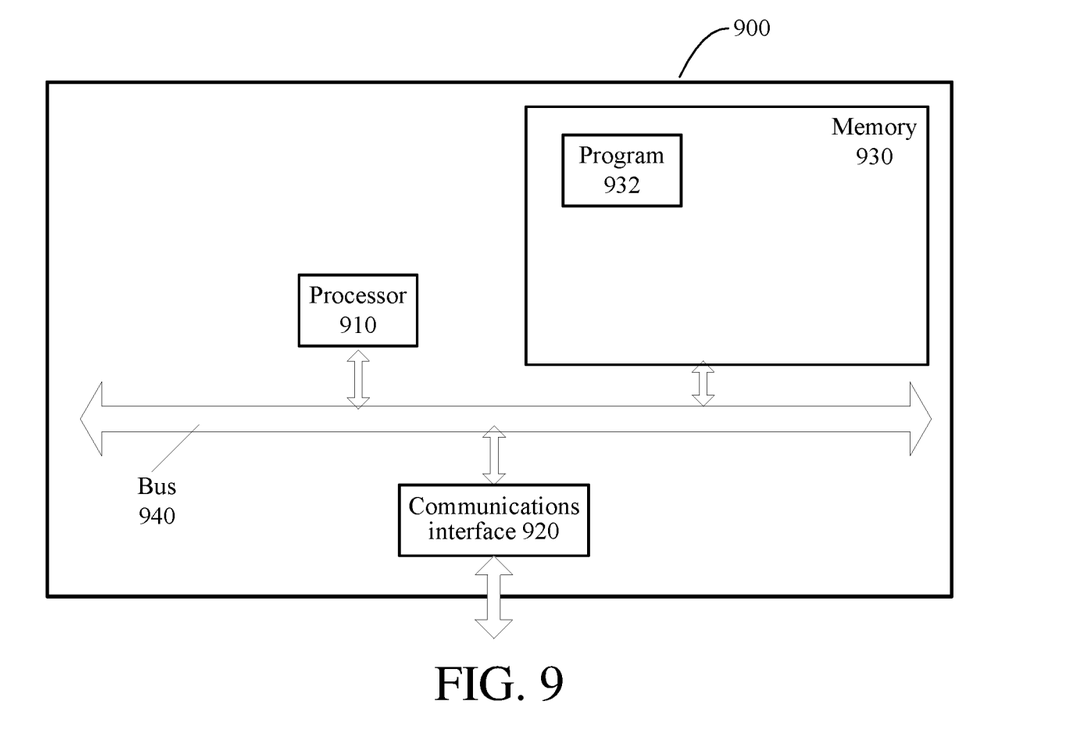
FIG. 9 is an example hardware structure diagram of a wireless energy receiving device in another example embodiment of the present application.

FIG. 9 is a schematic structural diagram of a wireless energy receiving device 900 in an embodiment of the present application, and the specific embodiment of the present application does not limit example embodiments of the wireless energy receiving device 900. As shown in FIG. 9, the wireless energy receiving device 900 may include:

a processor 910, a communications interface 920, a memory 930, and a communications bus 940.

The processor 910, the communications interface 920, and the memory 930 complete mutual communications via the communications bus 940.

The communications interface 920 is configured to communicate with a network element such as a client.

The processor 910 is configured to execute a program 932, and specifically, can implement relevant functions in the system embodiment shown in FIG. 4.

Specifically, the program 932 may include a program code, the program code including a computer operation instruction.

The processor 910 may be a central processing unit (CPU), or an application specific integrated circuit (ASIC), or be configured to be one or more integrated circuits which implement the embodiments of the present application.

The memory 930 is configured to store the program 932. The memory 930 may include a high-speed RAM memory, and may also include a non-volatile memory, for example, at least one magnetic disk memory. The program 932 may specifically perform the following steps:

determining wireless energy transmission efficiencies between the wireless energy receiving device and the plurality of wireless energy sending devices respectively; and receiving wireless energy transmission from the plurality of wireless energy sending devices according to the wireless energy transmission efficiencies.

Although the subject matter described herein is provided in a general context executed in combination with execution of an operating system and applications on a computer system, those skilled in the art may realize that other implementations may also be executed in combination with other types of program modules. Generally, the program modules include routines, programs, components, data structures and other types of structures executing particular tasks or implement particular abstract data types. Those skilled in the art can understand that, the subject matter described herein may be practiced with other computer system configurations, including handheld devices, multiprocessor systems, microprocessor-based or programmable consumer electronic products, minicomputers, mainframe computers, etc., and may also be used in a distributed computing environment in which tasks are executed by remote processing devices connected via a communication network. In the distributed computing environment, the program modules may be located in both local and remote memory storage devices.

It can be appreciated by those of ordinary skill in the art that each exemplary unit and method step described with reference to the embodiments disclosed herein can be implemented by electronic hardware or a combination of computer software and electronic hardware. Whether these functions are executed in a hardware mode or a software mode depends on particular applications and design constraint conditions of the technical solution. The professional technicians can use different methods to implement the functions described with respect to each particular application, but such implementation should not be considered to go beyond the scope of the present application.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and includes several instructions for enabling a computer apparatus (which can be a personal computer, a server, a network device, or the like) to execute all or some steps of the method described in each embodiment of the present application. The foregoing computer-readable storage medium includes physical volatile and non-volatile, removable and non-removable media implemented in any manner or technology of storing information such as computer-readable instructions, data structures, program modules or other data. The computer-readable storage medium specifically includes, but is not limited to, a USB disk, a mobile hard disk, a read-only memory (ROM), a random access memory (RAM), an erasable programmable read-only memory (EPROM), an electrically erasable programmable read-only memory (EEPROM), a flash memory or another solid state memory technology, a CD-ROM, a digital versatile disk (DVD), an HD-DVD, a Blue-Ray or other optical storage devices, magnetic tape, magnetic disk storage or other magnetic storage devices, or any other media that can be used to store required information and can be accessed by a computer.

The above implementations are merely used to describe the present application, instead of limiting the present application; various alterations and variations can be made by those of ordinary skill in the art without departing from the spirit and scope of the present application, so all equivalent technical solutions also belong to the scope of the present application, and the scope of patent protection of the present application should be defined by claims.

What is claimed is:

1. A method, comprising:
   determining, by a system comprising a processor, a total energy to be charged to a wireless energy receiving device;
   determining respective wireless energy transmission efficiencies between the wireless energy receiving device and a plurality of wireless energy sending devices;

performing energy distribution in the plurality of wireless energy sending devices according to the respective wireless energy transmission efficiencies, comprising distributing the total energy to the plurality of wireless energy sending devices according to the respective wireless energy transmission efficiencies, resulting in respectively distributed energy, so that the plurality of wireless energy sending devices perform respective wireless energy transmissions according to the respectively distributed energy; and receiving the respective wireless energy transmissions from the plurality of wireless energy sending devices according to a result of the energy distribution, wherein the performing the energy distribution comprises:

performing the energy distribution in the plurality of wireless energy sending devices based on a predetermined rule, and wherein the predetermined rule comprises that a proportion of remaining energy of the plurality of wireless energy sending devices remains unchanged before and after the wireless energy transmission or remaining energy of the plurality of wireless energy sending devices is equal after completion of the wireless energy transmission.

2. The method of claim 1, wherein the determining the respective wireless energy transmission efficiencies comprises:

determining respective energy transmission paths between the wireless energy receiving device and the plurality of wireless energy sending devices; and determining the respective wireless energy transmission efficiencies between the wireless energy receiving device and the plurality of wireless energy sending devices respectively according to the respective energy transmission paths.

3. The method of claim 2, wherein the determining the respective wireless energy transmission efficiencies comprises:

forming a wireless energy transmission path data structure, the wireless energy transmission path data structure comprising the respective energy transmission paths between the wireless energy receiving device and the plurality of wireless energy sending devices and the respective wireless energy transmission efficiencies between the wireless energy receiving device and the plurality of wireless energy sending devices.

4. The method of claim 2, wherein the determining the respective energy transmission paths comprises:

determining at least one candidate energy transmission path between the wireless energy receiving device and at least one wireless energy sending device of the plurality of wireless energy sending devices; and determining the respective energy transmission paths between the wireless energy receiving device and the plurality of wireless energy sending devices according to the at least one candidate energy transmission path.

5. The method of claim 4, wherein the determining the respective wireless energy transmission efficiencies further comprises:

determining the respective wireless energy transmission efficiencies of the energy transmission paths as the respective wireless energy transmission efficiencies between the wireless energy receiving device and the plurality of wireless energy sending devices.

6. The method of claim 1, wherein the predetermined rule comprises that a total energy loss in the wireless energy transmission is at a minimum.

7. The method of claim 1, wherein the receiving the respective wireless energy transmissions comprises:

receiving the respective wireless energy transmissions from the plurality of wireless energy sending devices in a predetermined order according to the result of the energy distribution.

8. The method of claim 1, wherein the receiving the respective wireless energy transmissions comprises:

notifying corresponding wireless energy sending devices of the result of the energy distribution corresponding to the corresponding wireless energy sending devices.

9. A wireless energy receiving device, comprising:

a processor, coupled to a memory, that executes or facilitates execution of executable modules, comprising:

a determining module configured to determine a total energy to be charged to a wireless energy receiving device;

a wireless energy transmission efficiency determination module configured to determine respective wireless energy transmission efficiencies between the wireless energy receiving device and a plurality of wireless energy sending devices; and an energy receiving module configured to:

perform energy distribution in the plurality of wireless energy sending devices according to the respective wireless energy transmission efficiencies, resulting in respectively distributed energy, so that the plurality of wireless energy sending devices perform respective wireless energy transmissions according to the respectively distributed energy, and receive the respective wireless energy transmissions from the plurality of wireless energy sending devices according to a result of the energy distribution, wherein the energy distribution unit is further configured to perform the energy distribution in the plurality of wireless energy sending devices based on a predetermined rule, and wherein the predetermined rule comprises that a proportion of remaining energy of the plurality of wireless energy sending devices remains unchanged before and after the wireless energy transmission or remaining energy of the plurality of wireless energy sending devices is equal after completion of the wireless energy transmission.

10. The wireless energy receiving device of claim 9, wherein the wireless energy transmission efficiency determination module comprises:

an energy transmission path determination unit configured to determine respective energy transmission paths between the wireless energy receiving device and the plurality of wireless energy sending devices respectively; and a wireless energy transmission efficiency determination unit configured to determine the respective wireless energy transmission efficiencies between the wireless energy receiving device and the plurality of wireless energy sending devices respectively according to the respective energy transmission paths.

11. The wireless energy receiving device of claim 10, wherein the energy transmission path determination unit comprises:

a candidate energy transmission path determination sub-unit configured to determine at least one candidate energy transmission path between the wireless energy receiving device and the plurality of wireless energy sending devices respectively; and an energy transmission path determination sub-unit configured to determine the respective energy transmission paths between the wireless energy receiving device and the plurality of wireless energy sending devices respectively according to the at least one candidate energy transmission path.

12. The wireless energy receiving device of claim 11, wherein the wireless energy transmission efficiency determination unit is further configured to determine respective other wireless energy transmission efficiencies of the energy transmission paths as the respective wireless energy transmission efficiencies between the wireless energy receiving device and the plurality of wireless energy sending devices.

13. The wireless energy receiving device of claim 9, wherein the energy receiving unit is further configured to receive the respective wireless energy transmission from the plurality of wireless energy sending devices in a predetermined order according to the result of the energy distribution.

14. The wireless energy receiving device of claim 9, wherein the energy receiving module comprises:
a distribution result notification unit configured to notify corresponding wireless energy sending devices of the result of the energy distribution corresponding to the wireless energy sending devices.

15. A computer readable storage device comprising executable instructions that, in response to execution, cause a device comprising a processor to perform operations, comprising:
determining a total energy to be charged to a wireless energy receiving device;
determining respective wireless energy transmission efficiencies between the wireless energy receiving device and wireless energy sending devices;
performing energy distribution in the plurality of wireless energy sending devices according to the respective wireless energy transmission efficiencies, comprising distributing the total energy to the plurality of wireless energy sending devices according to the respective wireless energy transmission efficiencies, resulting in respectively distributed energy, wherein the plurality of wireless energy sending devices perform respective wireless energy transmissions according to the respectively distributed energy; and
receiving the respective wireless energy transmissions from the wireless energy sending devices according to a result of the energy distribution,
wherein the performing the energy distribution comprises:
performing the energy distribution in the plurality of wireless energy sending devices based on a predetermined rule, and
wherein the predetermined rule comprises that a proportion of remaining energy of the plurality of wireless energy sending devices remains unchanged before and after the wireless energy transmission or remaining energy of the plurality of wireless energy sending devices is equal after completion of the wireless energy transmission.

16. The computer readable storage device of claim 15, wherein the determining the respective wireless energy transmission efficiencies comprises:
determining respective energy transmission paths between the wireless energy receiving device and the plurality of wireless energy sending devices; and
determining the respective wireless energy transmission efficiencies between the wireless energy receiving device and the plurality of wireless energy sending devices respectively according to the respective energy transmission paths.

17. The computer readable storage device of claim 16, wherein the determining the respective wireless energy transmission efficiencies comprises:
forming a wireless energy transmission path data structure,
the wireless energy transmission path data structure comprising the respective energy transmission paths between the wireless energy receiving device and the plurality of wireless energy sending devices and the respective wireless energy transmission efficiencies between the wireless energy receiving device and the plurality of wireless energy sending devices.

18. The computer readable storage device of claim 16, wherein the determining the respective energy transmission paths comprises:
determining at least one candidate energy transmission path between the wireless energy receiving device and at least one wireless energy sending device of the plurality of wireless energy sending devices; and
determining the respective energy transmission paths between the wireless energy receiving device and the plurality of wireless energy sending devices according to the at least one candidate energy transmission path.

19. The computer readable storage device of claim 18, wherein the determining the respective wireless energy transmission efficiencies further comprises:
determining the respective wireless energy transmission efficiencies of the energy transmission paths as the respective wireless energy transmission efficiencies between the wireless energy receiving device and the plurality of wireless energy sending devices.

20. The computer readable storage device of claim 15, wherein the predetermined rule comprises that a total energy loss in the wireless energy transmission is at a minimum.

21. The computer readable storage device of claim 15, wherein the receiving the respective wireless energy transmissions comprises:
receiving the respective wireless energy transmissions from the plurality of wireless energy sending devices in a predetermined order according to the result of the energy distribution.

* * * * *